US008188890B2

(12) United States Patent
He

(10) Patent No.: US 8,188,890 B2
(45) Date of Patent: May 29, 2012

(54) SYSTEMS AND METHODS FOR ENHANCING OBSTACLES AND TERRAIN PROFILE AWARENESS

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 751 days.

(21) Appl. No.: 12/270,439

(22) Filed: Nov. 13, 2008

(65) Prior Publication Data
US 2010/0117867 A1 May 13, 2010

(51) Int. Cl.
G08B 21/00 (2006.01)

(52) U.S. Cl. ............. 340/963; 340/971; 701/4; 701/9; 345/639

(58) Field of Classification Search ........... 340/963, 340/970, 971, 977; 345/629, 632; 701/2–9
See application file for complete search history.

(56) References Cited

U.S. PATENT DOCUMENTS

| | | | | |
|---|---|---|---|---|
| 4,916,448 A | * | 4/1990 | Thor | 340/970 |
| 7,212,216 B2 | * | 5/2007 | He et al. | 345/629 |
| 2003/0193411 A1 | | 10/2003 | Price | |
| 2004/0225420 A1 | | 11/2004 | Morizet et al. | |
| 2007/0002078 A1 | | 1/2007 | He et al. | |

FOREIGN PATENT DOCUMENTS

| | | |
|---|---|---|
| EP | 1906151 A2 | 4/2008 |
| EP | 1944580 A1 | 7/2008 |

OTHER PUBLICATIONS

Klomparens, D., "Automated Landing Site Evaluation for Semi-Autonomous Unmanned Aerial Vehicles," Thesis submitted to Virginia Polytechnic Institute and State University, Aug. 20, 2008, [retrieved on Feb. 12, 2010]. Retrieved from Internet: <URL: http://scholar.lib.vt.edu/theses/available/etd-08192008-231631/unrestricted/Thesis.pdf>.
European Search Report dated May 10, 2010, for Application No. 09169180.

* cited by examiner

Primary Examiner — Jeffery Hofsass
(74) Attorney, Agent, or Firm — Ingrassia Fisher & Lorenz, P.C.

(57) ABSTRACT

A display system for an aircraft includes a processing unit configured to receive data related to an aircraft profile and to supply display commands with symbology based on the aircraft profile; and a display device coupled the processing unit and configured to receive the display commands and operable to render a three-dimensional view with the symbology based on the aircraft profile. The symbology may include slope symbology.

17 Claims, 3 Drawing Sheets

SYSTEMS AND METHODS FOR ENHANCING OBSTACLES AND TERRAIN PROFILE AWARENESS

STATEMENT REGARDING FEDERALLY SPONSORED RESEARCH OR DEVELOPMENT

This invention was made with Government support under Agreement No. W31P4Q-07-C-0182 awarded by DARPA Via AMCOM. The Government may have certain rights in this invention.

TECHNICAL FIELD

The present invention generally relates to aircraft display systems and methods and, more particularly, to systems and methods that display images for enhancing obstacle and terrain profile awareness.

BACKGROUND

Computer generated aircraft displays have become highly sophisticated and capable of displaying a substantial amount of flight management, navigation, and control information that gives flight crews more effective control of the aircraft and a reduction in workload. In this regard, electronic displays, such as Heads-Up Displays (HUDs) and Heads-Down Displays (HDDs), are used in aircraft as Primary Flight Displays. For example, the Primary Flight Display can combine critical flight instrumentation (e.g., altitude, attitude, heading, airspeed, vertical speed instruments) and primary engine instrument indicators into a single, readily interpretable display.

Some Primary Flight Displays may provide a 3D, synthetic perspective view of the terrain surrounding the aircraft, including man-made and natural terrain. However, computer generated, synthetic perspective views may not provide a pilot with complete situational awareness. Designers are constantly attempting to enhance awareness, particularly with respect to obstacle and terrain profiles, without unnecessarily cluttering the display.

Accordingly, it is desirable to provide systems and methods that enhance obstacle and terrain profile awareness on a visual display, such as, for example, a Primary Flight Display, similar electronic aircraft displays, and other types of electronic displays. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a display system for an aircraft is provided. The system includes a processing unit configured to receive data related to an aircraft profile and to supply display commands with symbology based on the aircraft profile; and a display device coupled the processing unit and configured to receive the display commands and operable to render a three-dimensional view with the symbology based on the aircraft profile. The symbology may include slope symbology.

In accordance with another exemplary embodiment, a method is provided for displaying symbology on a Primary Flight Display of an aircraft. The method includes determining an aircraft profile based on aircraft and flight characteristics; constructing a footprint based on the aircraft profile; evaluating terrain slope within the footprint; and displaying symbology based on the terrain slope within the footprint.

In accordance with yet another exemplary embodiment, a Primary Flight Display system for an aircraft includes a processing unit configured to receive data related to an aircraft profile and to supply display commands with symbology based on the aircraft profile; and a display device coupled the processing unit and configured to receive the display commands and operable to render the common three-dimensional view with symbology based on the aircraft profile. The symbology includes slope symbology and a footprint based on the aircraft profile, and the symbology further includes obstacle warning symbology within the footprint.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide visual display systems and methods for aircraft. More specifically, the visual display systems and methods enhance obstacle and terrain profile awareness. For example, the characteristics of the symbology used to represent obstacles and terrain may be based on the specific profile of the aircraft and/or flight path. The symbology may include a footprint with obstacle warnings and slope indications.

Figure 1:
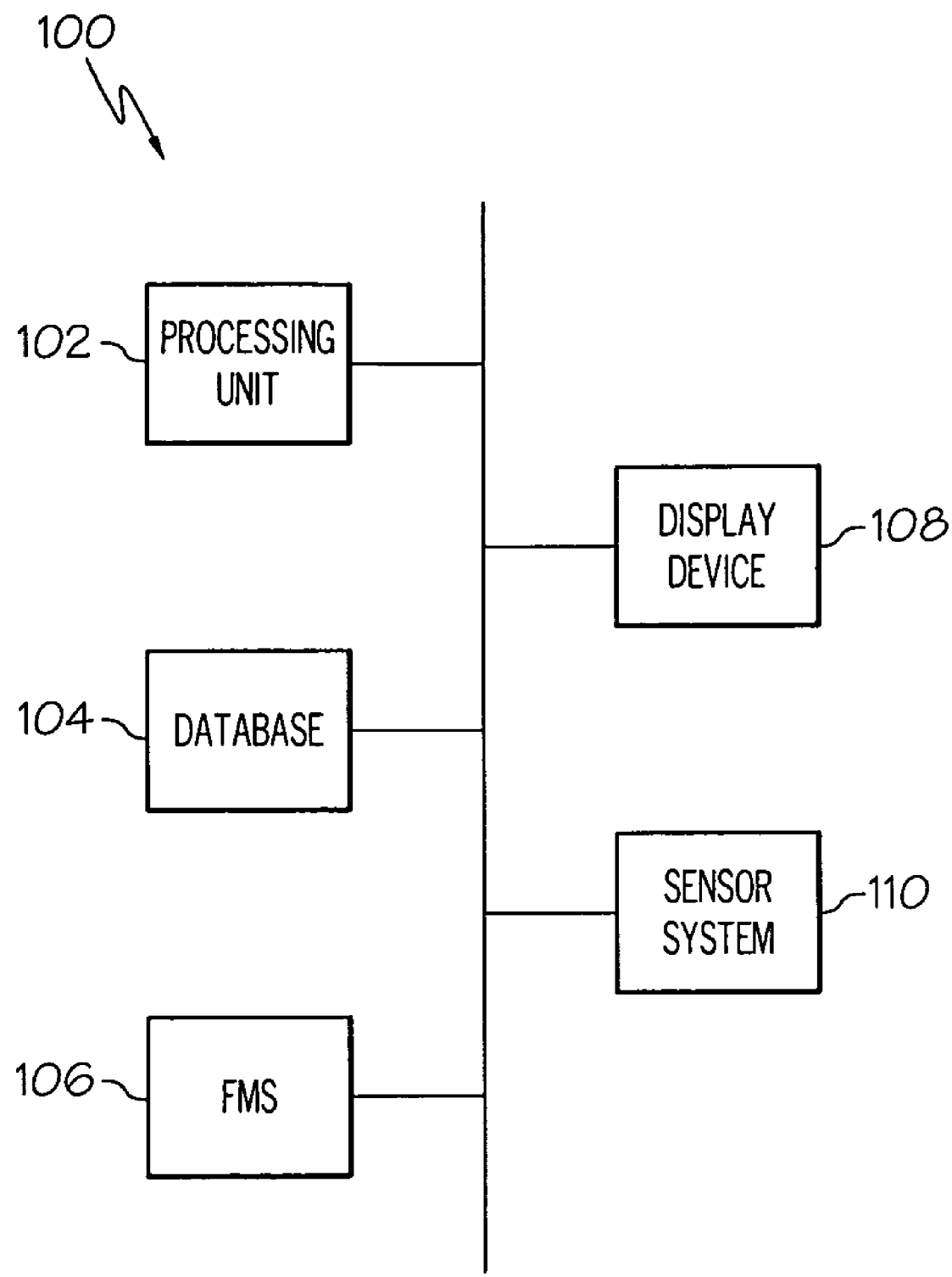
FIG. 1 is a functional block diagram of an aircraft display system according to an exemplary embodiment.

FIG. 1 depicts a block diagram of an exemplary aircraft visual display system 100 for displaying symbology that enhances obstacle and terrain awareness. In the exemplary embodiment shown, the system 100 includes a processing unit 102, a database 104, a flight management system 106, a display device 108, and a sensor system 110. Although the system 100 appears in FIG. 1 to be arranged as an integrated system, the system 100 is not so limited and can also include an arrangement whereby one or more of the processing unit 102, the database 104, the flight management system 106, the display device 108, and the sensor system 110 are separate components or subcomponents of another system located either onboard or external to an aircraft. Also, for example, the system 100 can be arranged as an integrated system (e.g., aircraft display system, Primary Flight Display system, a Head Up Display with SVS or EVS as an overlay, a "near to eye display" system, or a head mounted display system, etc.) or a subsystem of a more comprehensive aircraft system (e.g., flight management system, navigation and control system, target aiming and control system, collision alert and/or avoidance system, weather avoidance system, etc.). The system 100 can be utilized in an aircraft, such as a helicopter, airplane, or unmanned vehicle. Moreover, exemplary embodiments of the system 100 can also be utilized in spacecraft, ships, submarines, fixed wing and rotor aircraft, such as helicopters, as well as other types of vehicles. For simplicity, embodiments are described below with reference to "aircraft."

The processing unit 102 can be a computer processor associated with a Primary Flight Display. Generally, the processing unit 102 receives and/or retrieves flight management information (e.g., from the flight management system 106) and landing, target and/or terrain information (e.g., from database 104 or sensor system 110). The processing unit 102 generates display control signals for a visual display of the flight management information, which includes navigation and control symbology such as a zero pitch reference line, heading indicators, tapes for airspeed and altitude, flight path information, RNP information, and any other information desired by a flight crew. As discussed in further detail below, the processing unit 102 may additionally receives and integrates terrain data from the database 104 and sensor system 110, and generates display control signals based on the terrain data. The processing unit 102 then sends the generated display control signals to a display device (e.g., the display device 108). More specific functions of the processing unit 102 will be discussed below.

Database 104 is coupled to processing unit 102 and can be a memory device (e.g., non-volatile memory, disk, drive, tape, optical storage device, mass storage device, etc.) that can store digital landing, waypoint, and target location as either absolute coordinate data or as a function of an aircraft's position. Database 104 can additionally include other types of navigation information, such as information used to calculate flight path. Database 104 can also include, for example, a terrain database, which includes the locations and elevations of natural and man-made terrain. The terrain can include obstacles, such as buildings and vehicles. Obstacle data can be stored together with terrain database or in a separated obstacle-only database. The geographic locations and height of the obstacles for various avionics applications can be obtained through survey or through various reporting services. Database 104 may further include slope information related to the terrain.

The sensor system 110 is coupled to the processing unit 102 and can include any suitable sensor for detecting terrain and providing data to the processing unit 102 based on the detected terrain. The sensor system 110 can include sensors such as radar, LIDAR, or forward-looking infrared (FLIR). Other types of imaging sensors may include types such as visible light, millimeter-wave radar, X-band weather radar, etc. In one embodiment, the sensor system 110 is a stand-alone system, although in other embodiments, the sensor system 110 can be used to completely or partially verify database 104. The sensor collected data, after additional verifications, may be later inserted into the database 104 for future uses.

The flight management system 106 is coupled to processing unit 102, and can provide navigation data associated with the aircraft's current position and flight direction (e.g., heading, course, track, etc.) to the processing unit 102. The navigation data provided to the processing unit 102 can also include information about the aircraft's airspeed, altitude, pitch, and other important flight information. In exemplary embodiments, the flight management system 106 can include any suitable position and direction determination devices that are capable of providing the processing unit 102 with at least an aircraft's current position (e.g., in latitudinal and longitudinal form), the real-time direction (heading, course, track, etc.) of the aircraft in its flight path, the waypoints along the flight path, and other important flight information (e.g., pitch, airspeed, altitude, attitude, etc.). Such information can be provided to the processing unit 102 by, for example, an Inertial Reference System (IRS), Air-data Heading Reference System (AHRS), and/or a global positioning system (GPS).

The system 100 also includes the display device 108 coupled to the processing unit 102. The display device 108 may include any device or apparatus suitable for displaying various types of computer generated symbols and information representing at least pitch, heading, flight path, airspeed, altitude, landing information, waypoints, targets, obstacle, terrain, and slope data in an integrated, multi-color or monochrome form. Using data retrieved (or received) from the flight management system 106, the processing unit 102 executes one or more algorithms (e.g., implemented in software) for determining the position of the various types of desired information on the display device 108. The processing unit 102 then generates a plurality of display control signals representing this data, and sends display control signals to the display device 108. The display device 108 and/or processing unit 102 may include a graphics display generator for generating the appropriate symbology on the screen of the display device 108, as discussed in greater detail below. In this embodiment, the display device 108 is an aircraft cockpit, multi-color display (e.g., a Primary Flight Display).

Although a cockpit display screen may be used to display the above-described flight information symbols and data, any suitable type of display medium capable of visually presenting multi-colored or monochrome flight information for a pilot or other flight crew member can be provided, such as, for example, various CRT and flat-panel display systems (e.g., CRT displays, LCDs, OLED displays, plasma displays, projection displays, HDDs, HUDs, etc.).

Figure 2:
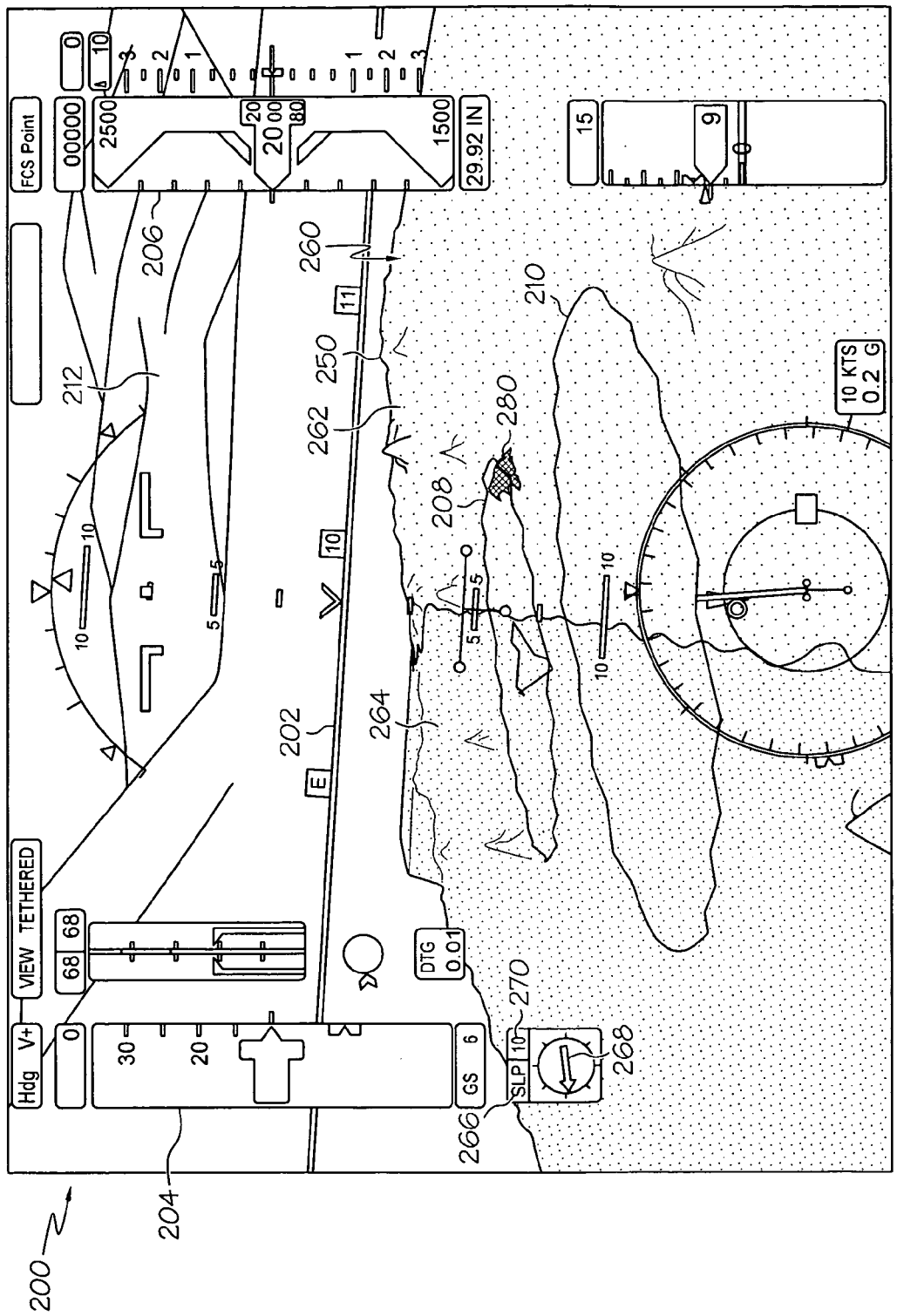
FIG. 2 depicts an exemplary image that may be rendered by the aircraft display system of FIG. 1.

An exemplary visual display 200 is shown in FIG. 2. The visual display 200 is an exemplary visual display that may be rendered, for example, by the aircraft display system 100 of FIG. 1.

The visual display 200 shows, among other things, computer generated symbols representing a zero pitch reference line 202, an airspeed scale or tape 204, an altitude scale or tape 206, a landing pad 208, current position 210, and terrain (e.g., identified generally as element 212). Although the visual display 200 is shown as an egocentric, first-person frame of reference, the visual display 200 can be a secondary, wingman, and/or plan or perspective view that enables a viewer to view the aircraft, as well as zoom in and out, including an unmanned vehicle and/or spacecraft. Although the visual display 200 is generally associated with a Primary Flight Display, the display can also be utilized on a multi-function display, Head Up Display, and/or a head mounted display.

In this embodiment, the terrain 212 is rendered as a three-dimensional, perspective view. The terrain 212 can include any representation of the environment surrounding the aircraft, including flattened terrain. Additionally, the terrain 212 can include a virtual plane selected by a pilot at certain elevation relative to the aircraft and is rendered at that elevation.

In addition, and as will now be described in more detail, the visual display 200 may selectively render symbology and/or adjust symbology based on the profile of the aircraft. The profile of the aircraft includes both characteristics of the aircraft itself, the flight path of the aircraft, and/or the current energy of the aircraft, the intended target or destination location.

In the depicted exemplary embodiment, the visual display 200 indicates a footprint 250 of the aircraft. As a general matter, the footprint 250 generally corresponds to the path of the aircraft and may include the area underneath, around, and in front of the aircraft. The size of the footprint may be a function of the profile of the aircraft, as noted above, and may particularly consider the span of the aircraft, the flight path, and the speed of the aircraft. The footprint 250 may be indicated by an enhancement of the displayed symbology, a change in color, and/or a change in texture. In one embodiment, the terrain 212 within the footprint 250 has a higher resolution than the terrain 212 outside of the footprint 250.

The visual display 200 may further include slope indication 260 in the footprint 250. The slope indication 260 may include an indication of the relative slope of the terrain within the footprint 250. The slope indication 260 may particularly give the pilot an indication of when the slope may be a problem for the aircraft, i.e., a warning. In the depicted embodiment, the slope indication 260 includes a change in relative color. For example, a first color (e.g., beige) 262 indicates relatively higher terrain, and a second color (e.g., dark green) 264 indicates relatively lower terrain. The slope indication 260 may further include a slope scale 266. The slope scale 266 includes a directional indicator 268, which indicates the direction of the slope by pointing in a downhill direction and may further match the relative colors additionally displayed by on the terrain 212. In other words, the right side of the directional indicator 268 may be in the first color (e.g., color 262) and the left side of the directional indicator 268 may be in the second color (e.g., color 264). The slope indication 260 additionally includes a slope quantity 270 of 10° to further provide a specific value of the slope.

In further exemplary embodiments, the appearance of the landing pad 208 may change to provide additional slope indication. For example, one side of the landing pad 208 may be stretched out to indicate the direction of slope. The outline of the profile and landing pad 208 may change appearance when slope or obstacle protrusions present dangers.

The visual display 200 further includes enhanced obstacle awareness in the footprint 250 for obstacles that may present an issue for the aircraft. As an example, terrain feature 280 is in the landing pad 208 of the aircraft, and may have a height that interferes with the landing procedure, cause the aircraft to tip over, and/or strike a wing or rotorblade. As such, the terrain feature 280 is rendered with a warning characteristic. In this case, the terrain feature 280 may be rendered in a warning color, such as red. The warning characteristic of the terrain feature 280 may further include a blinking action and/or a change in texture. As noted above, the number of terrain features with enhanced obstacle awareness and/or the nature of any warning characteristics may be a function of the profile of the aircraft.

As noted above, the rendered symbology and/or adjusted symbology are based on the profile of the aircraft. For example, the profile may be a simple circle marching rotor size for a helicopter or may include added size or changed shape when there are cross winds which may cause the aircraft to drift. Additionally, some of the profile tracing lines can be added inside the profile to further highlight the terrain or obstacle profile relative to the aircraft profile or foot print. For example the triangle within landing pad 208 indicates the wheel areas for a helicopter. Although the symbology indicates that at least some of the terrain in the landing pad 208, the line profile represents the relative flatness or the area, with the exception of terrain feature 280.

Figure 3:
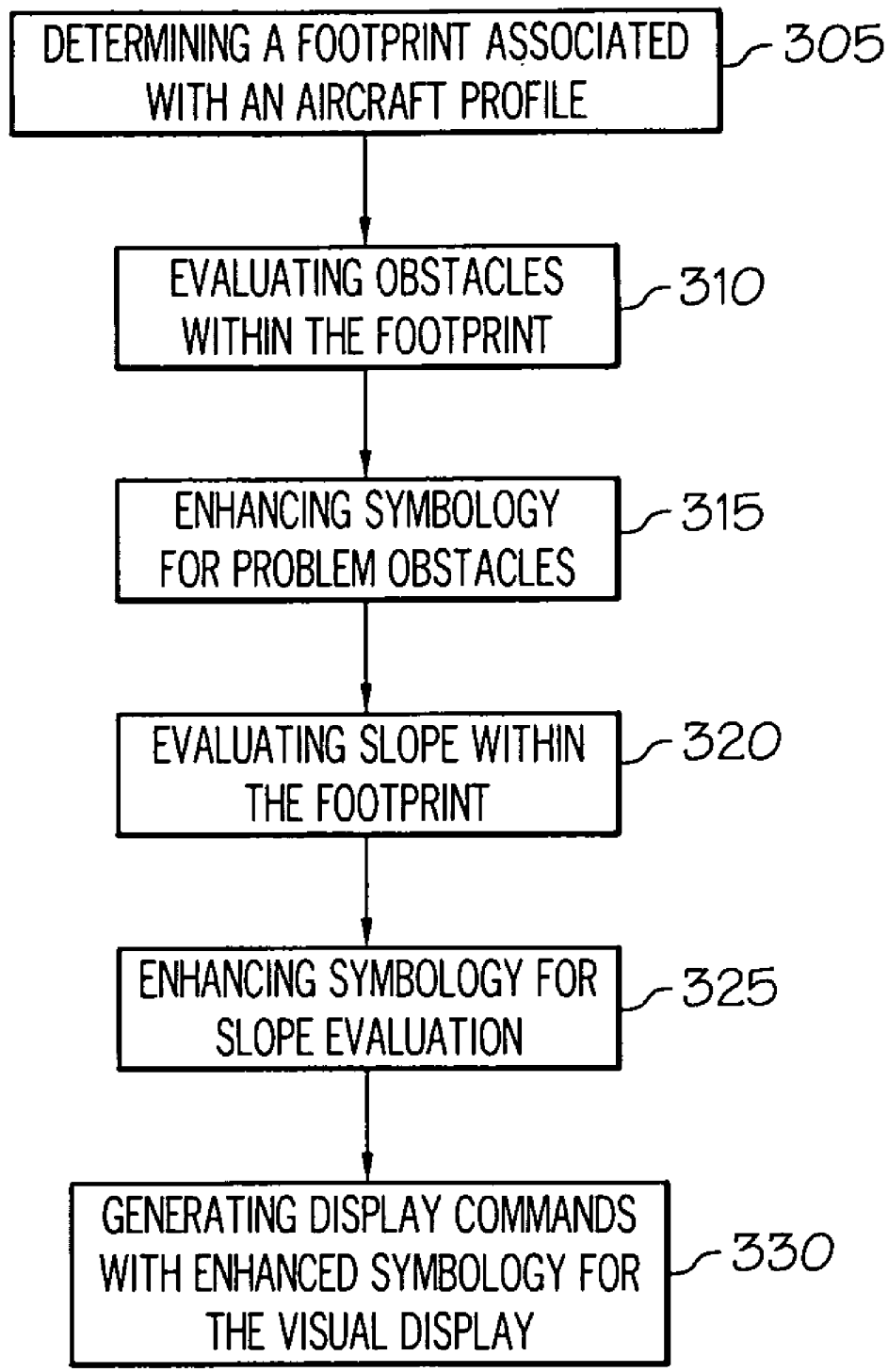
FIG. 3 is a flowchart describing an exemplary method for enhancing obstacle and terrain profile awareness.

FIG. 3 is a flow chart that depicts a method 300 for enhancing obstacle and terrain profile awareness in 3D, synthetic view for a Primary Flight Display of an aircraft, such as for example, the system 100 discussed above. As such, the method 300 of FIG. 3 will be described with reference to FIG. 1.

In a first step 305, the processing unit 102 receives data from the database 104, flight management system 106, and/or sensor system 108. The processing 102 then determines a footprint (e.g., footprint 250) corresponding to the aircraft profile, including the aircraft and flight characteristics.

In second step 310, the processing unit 102 evaluates obstacles in the footprint based on the aircraft profile. In a third step 315, the processing unit 102 enhances the symbology for any obstacle that may present a problem for the aircraft. For example, the processing unit 102 may provide warning symbology for such obstacles.

In a fourth step 320, the processing unit 102 evaluates the slope within the footprint, and in a fifth step 325, the processing unit 102 provides symbology that indicates the slope evaluation. The slope symbology may include color changes and/or graphical slope indicators. In a sixth step 330, the processing unit 102 generates display command signals based on the symbology such that a visual display (e.g., visual display 200) may be provided on the display device 108.

Accordingly, the system 100 and the method 300 may enhance obstacle and terrain profile awareness. Particularly, exemplary embodiments may include the following enhancements: enhanced awareness of terrain and obstacle field fluctuations within an operational footprint of the aircraft by color encoding obstacle height fluctuations beyond a predetermined height limit profile for the safe operation; use of color coding to precisely indicate the limit of a safe operating profile; using terrain tracing lines to indicate the terrain profiles along the operating footprint and the landing pad; color coding terrain features to indicate an unsafe condition; a graphic icon displaying precise sloping and orientation of the terrain profile the landing pad; and slope direction indications.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, comprising:
   a processing unit configured to receive data related to an aircraft profile and to supply display commands with symbology based on the aircraft profile; and
   a display device coupled the processing unit and configured to receive the display commands and operable to render a three-dimensional view with the symbology based on the aircraft profile, the symbology comprising slope symbology, wherein the slope symbology includes a slope indicator, and wherein the slope indicator includes an arrow pointing in a sloping direction.

2. The display system of claim 1, wherein the symbology includes a footprint based on the aircraft profile, and wherein the slope symbology is provided within the footprint, the slope symbology including terrain tracing lines.

3. The display system of claim 2, wherein the footprint has a different color or texture relative to any surrounding symbology.

4. The display system of claim 1, wherein the slope symbology includes a first color for a first elevation and a second color for a second elevation.

5. The display system of claim 1, wherein the slope symbology includes at least two colors indicating relative elevation.

6. The display system of claim 1, wherein the arrow is color coded.

7. The display system of claim 1, wherein the slope indicator provides a numerical indication of the slope.

8. The display system of claim 2, wherein the footprint includes a landing pad.

9. The display system of claim 2, wherein symbology includes obstacle warning symbology within the footprint.

10. The display system of claim 9, wherein the obstacle warning symbology includes a warning color.

11. The display system of claim 1, wherein the aircraft profile includes aircraft characteristics.

12. The display system of claim 1, wherein the aircraft profile includes flight characteristics.

13. The display system of claim 1, wherein the display device is a Primary Flight Display (PFD).

14. A method for displaying symbology on a Primary Flight Display of an aircraft, comprising:
   determining an aircraft profile based on aircraft and flight characteristics;
   rendering a three-dimensional view of terrain surrounding the aircraft;
   constructing a footprint based on the aircraft profile such that the three-dimensional view includes the footprint and a remaining portion of the terrain surrounding the aircraft outside of the footprint;
   evaluating terrain slope within the footprint; and
   displaying symbology based on the terrain slope within the footprint, wherein the displaying step includes displaying symbology that includes a slope indicator with an arrow pointing in a downhill slope direction.

15. The method of claim 14, wherein the displaying step includes displaying symbology in a first color for a first elevation and in a second color for a second elevation.

16. The method of claim 14, wherein the displaying step includes displaying symbology that includes obstacle warning symbology within the footprint.

17. A Primary Flight Display system for an aircraft, comprising:
   a processing unit configured to receive data related to an aircraft profile and to supply display commands with symbology based on the aircraft profile; and
   a display device coupled the processing unit and configured to receive the display commands and operable to render the common three-dimensional view with symbology based on the aircraft profile, the symbology comprising slope symbology and a footprint based on the aircraft profile, the symbology further including obstacle warning symbology within the footprint, wherein the slope symbology includes a slope indicator with an arrow pointing in a sloping direction.

* * * * *